(12) United States Patent　(10) Patent No.:　US 8,823,989 B2
Watanabe　(45) Date of Patent:　Sep. 2, 2014

(54) PRINTING SYSTEM, PREVIEW DISPLAY CONTROL PROGRAM AND PREVIEW DISPLAY CONTROL METHOD

(71) Applicant: Konica Minolta, Inc., Tokyo (JP)

(72) Inventor: Naoki Watanabe, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 6 days.

(21) Appl. No.: 13/683,340

(22) Filed: Nov. 21, 2012

(65) Prior Publication Data

US 2013/0135672 A1　May 30, 2013

(30) Foreign Application Priority Data

Nov. 29, 2011　(JP) ................................ 2011-260883

(51) Int. Cl.
*G06F 3/12*　(2006.01)
(52) U.S. Cl.
CPC ................ *G06F 3/12* (2013.01); *G06F 3/1256* (2013.01); *G06F 3/1288* (2013.01); *G06F 3/1228* (2013.01); *G06F 3/1287* (2013.01); *G06F 3/122* (2013.01); *G06F 3/1208* (2013.01)
USPC ........................................................ 358/1.15
(58) Field of Classification Search
CPC ....................................................... G06F 3/12
USPC ........................................................ 358/1.15
See application file for complete search history.

(56) References Cited

U.S. PATENT DOCUMENTS

2010/0097644　A1*　4/2010　Takahashi .................... 358/1.15
2011/0128574　A1　6/2011　Kouno

FOREIGN PATENT DOCUMENTS

| JP | 2002-351629 | 12/2002 |
|----|-------------|---------|
| JP | 2008-304709 | 12/2008 |
| JP | 2011-114598 | 6/2011 |
| JP | 2011-159091 | 8/2011 |

OTHER PUBLICATIONS

Machine translation for JP 2002-351629, IDS.*
Machine translation for JP 2008-304709, IDS.*
Japanese Office Action issued Nov. 1, 2013 in counterpart Japanese Application No. 2011-260883.

* cited by examiner

*Primary Examiner* — Qian Yang
(74) *Attorney, Agent, or Firm* — Holtz Holtz Goodman & Chick PC

(57) ABSTRACT

A printing system including a client terminal, a printing apparatus, and a Web server for allowing the client terminal to display a print preview image, wherein the client terminal includes: a print setting section which, when a print setting is changed on a screen notifies the Web server of the changed print setting and requires creation of a print preview image, and when a predetermined time period has elapsed after the change, requests the print preview image reflecting the changed print setting; and a preview display section which displays the image acquired from the Web server, and wherein the Web server includes: a control section which, when the changed print setting is notified, creates the print preview image by reflecting the change, and when the print preview image is required, sends the print preview image reflecting the changed print setting to the client terminal.

16 Claims, 4 Drawing Sheets

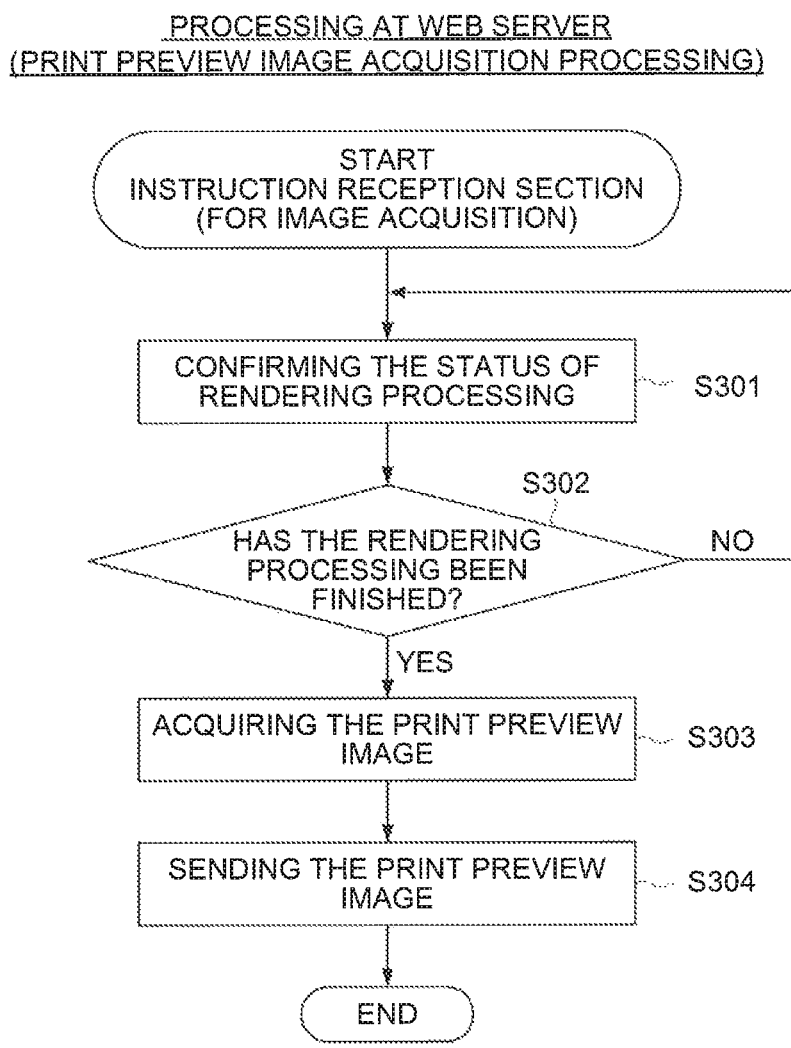

PRINTING SYSTEM, PREVIEW DISPLAY CONTROL PROGRAM AND PREVIEW DISPLAY CONTROL METHOD

BACKGROUND OF THE INVENTION

Technical Field

The present invention relates to a printing system, a preview display control program, and a preview display control method for controlling a display of print preview image.

In cases of executing printing with a printing apparatus, by displaying a preview image showing print outputting conditions on a screen and confirming this print preview image, a useless print is prevented. Further, in cases of instructing printing to a printing apparatus, by using a printer driver of a client and displaying a print preview image on a screen of the client, the useless print is prevented. Further, in recent years, by use of a Web application provided by a Web server, a method of displaying a print preview image created by the Web server on a Web screen of the client is utilized.

Regarding the print preview image display, for example, the unexamined Japanese Patent Application Publication No. 2008-304709 (Patent Document 1), discloses a configuration of an image forming apparatus, having a preview display function for displaying an output image, which is provided with a display means to display a plurality of preview display images on a display unit for concurrently showing output images of multiple different setting contents, a setting content changing means respectively provided on each preview display screen for changing the setting content corresponding to the respective display screen, and a means for changing the output image being displayed on the preview screen corresponding to the setting content changing means to the output image in accordance with the changed setting content, in cases where the setting content is changed by any of the setting content changing means.

According to an existing Web application for displaying the print preview screen, after all print settings are completed at a client side, the print setting contents are sent to a Web server, the print preview image reflecting the print setting contents is created at the Web server side and sent back to the client side to display on the screen of client side, however, there are problems such as the status under the setting being unable to be confirmed.

Further, as a method of solving the above problem, there may be a method of updating the preview display by every print setting change similarly to the Patent Document 1. In case of utilizing this method on the Web application, the Web server creates the print preview image and sends to the client side at every time of changing one setting content, and the print preview image on the client side screen is updated as needed.

However, according to this method, at every print setting change, processing of print preview image creation, data transfer, and the like are generated, and an update waiting time is generated to cause deterioration of performance and operability, and a problem of increasing network communication volume is generated.

The present invention is performed in view of the above described problems, and an object of the invention is to provide a printing system, a preview display control program, and a preview display control method which enable to properly confirm the on-the-way status of the print setting by the preview image, while suppressing the influence to performance and operability.

SUMMARY

To achieve at least one of the abovementioned objects, a printing system reflecting one aspect of the present invention includes a client terminal to accept a change of print setting, a printing apparatus to execute printing, and a Web server to display and a print preview image created by reflecting the changed print setting on a Web browser of the client terminal, which are connected by a network, wherein the client terminal includes:

a print setting section which, in cases where the print setting is changed on a screen, notifies the Web server of the changed print setting and requires creation of a print preview image, and when a predetermined time period has elapsed after the print setting being changed, notifies the Web server of a request of acquiring the print preview image created by reflecting the changed print setting, and a preview display section which displays, on the screen, the print preview image acquired from the Web server, and wherein the Web server includes:

a control section which, in cases where the changed print setting is notified from the client terminal, creates the print preview image by reflecting the changed print setting, and when the request of acquiring the print preview image is notified from the client terminal, sends the print preview image created by reflecting the changed print setting to the client terminal.

A client terminal reflecting the other aspect of the present invention being connectable to a Web server which accepts a change of print setting and allows a Web browser of the client terminal to display a print preview image created by reflecting the changed print setting, the client terminal including:

a print setting section which, in cases where the print setting is changed on a screen, notifies the Web server of the changed print setting and requires creation of a print preview image, and when a predetermined time period has elapsed after the print setting being changed, notifies the Web server of a request of acquiring the print preview image created by reflecting the changed print setting; and a preview display section which displays, on the screen, the print preview image acquired from the Web server.

A non-transitory computer readable storage medium having a program stored thereon that is executable by a computer to perform a preview display method, reflecting another aspect of the present invention, for making a client terminal, which accepts a change of print setting and connectable to a Web server allowing a Web browser of the client terminal to display a print preview image created by reflecting the changed print setting, execute the steps of:

notifying, in cases where the print setting is changed on a screen, the Web server of the changed print setting and requiring creation of a print preview image, and when a predetermined time period has elapsed ear the print setting being changed, notifying the Web server of a request of acquiring the print preview image created by reflecting the changed print setting; and displaying, on the screen, the print preview image acquired from the Web server.

BRIEF DESCRIPTION OF THE DRAWINGS

FIG. 5 is a flowchart showing processing of a Web server (preview image acquiring processing) relating an embodiment of the present invention.

DETAILED DESCRIPTION OF THE PREFERRED EMBODIMENT

As shown in the background technology, the conventional Web application has a problem such that the halfway status of print setting cannot be confirmed, since the print preview image reflected with print setting contents is displayed after all the print setting is finished. Further, the method of updating the print preview image at every time of changing a setting content may be considered, however, according to this method, at every print setting change, processing of print preview image creation, data transfer, and the like are generated, and an update waiting time is generated to cause deterioration of performance and operability, and a problem of increasing network communication volume is also generated.

Therefore, according to an embodiment of the present invention, in an Web application capable of displaying a print preview image reflecting a print setting content of a document file, in case of changing the print setting, the updating of the print preview image is not executed in real time, but the print preview image is updated when a predetermined time has elapsed after a user changed the print setting. Due to the above, deterioration of performance and operability, caused by the preview image updating waiting time generated at every time of changing the print setting, can be suppressed, traffic load of the network can be lessened, and print setting can be properly confirmed.

Embodiment

Figure 1:
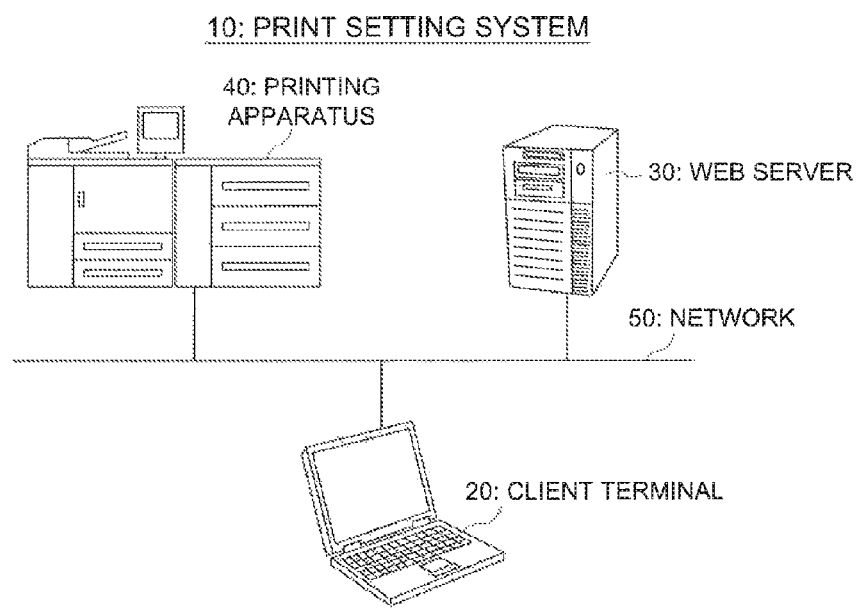
FIG. 1 is a schematic diagram showing an overall configuration of a printing system relating to an embodiment of the present invention.
Figure 2:
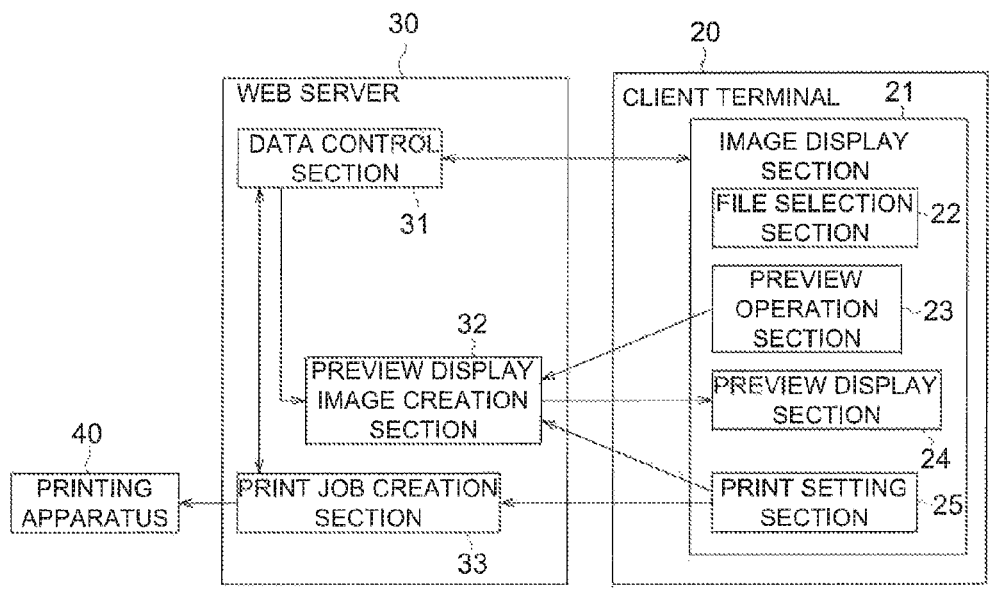
FIG. 2 is a block diagram showing a software configuration of the printing system relating to an embodiment of the present invention.
Figure 3:
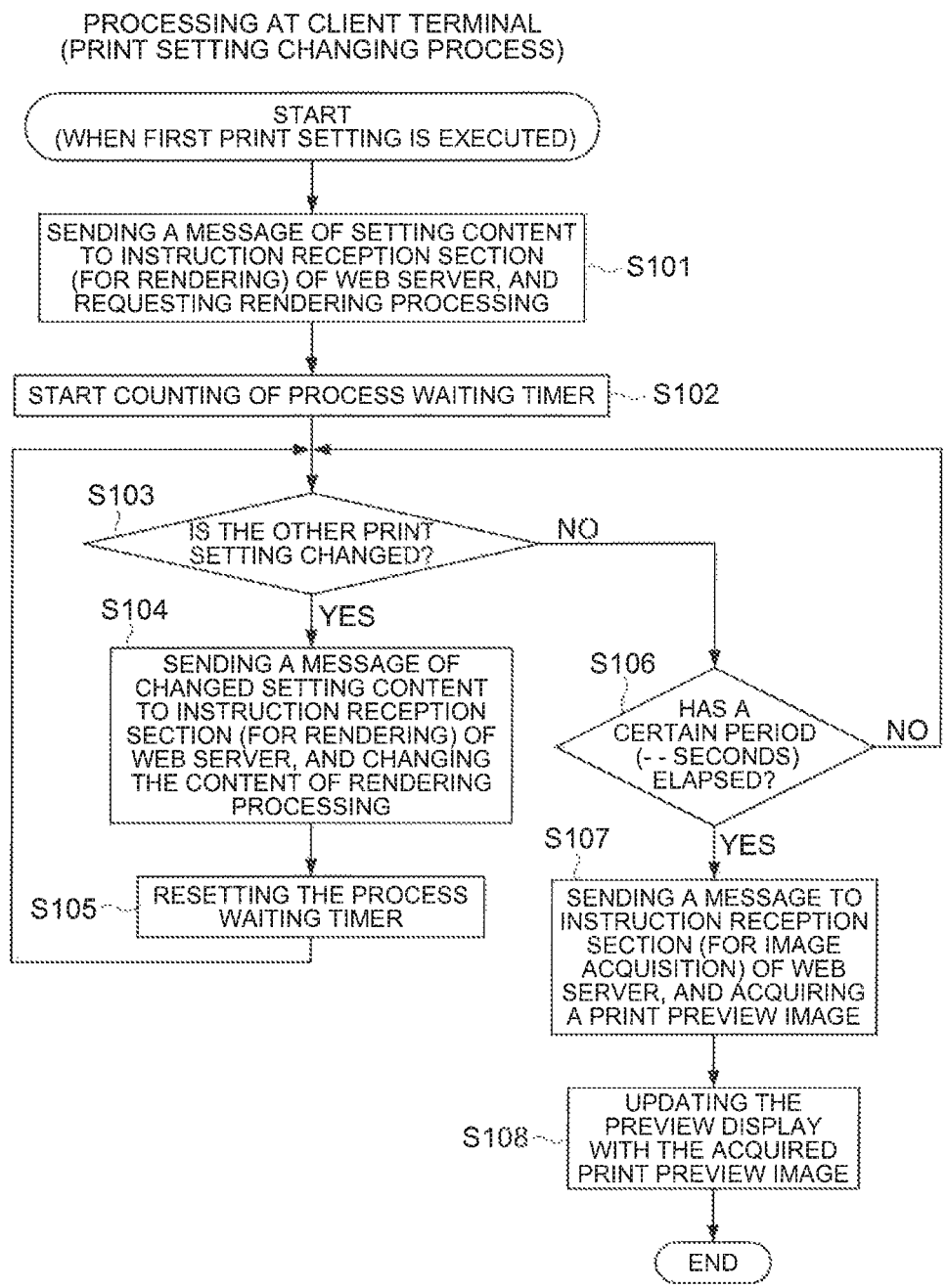
FIG. 3 is a flowchart showing processing of a client terminal (print setting changing processing) relating an embodiment of the present invention.
Figure 4:
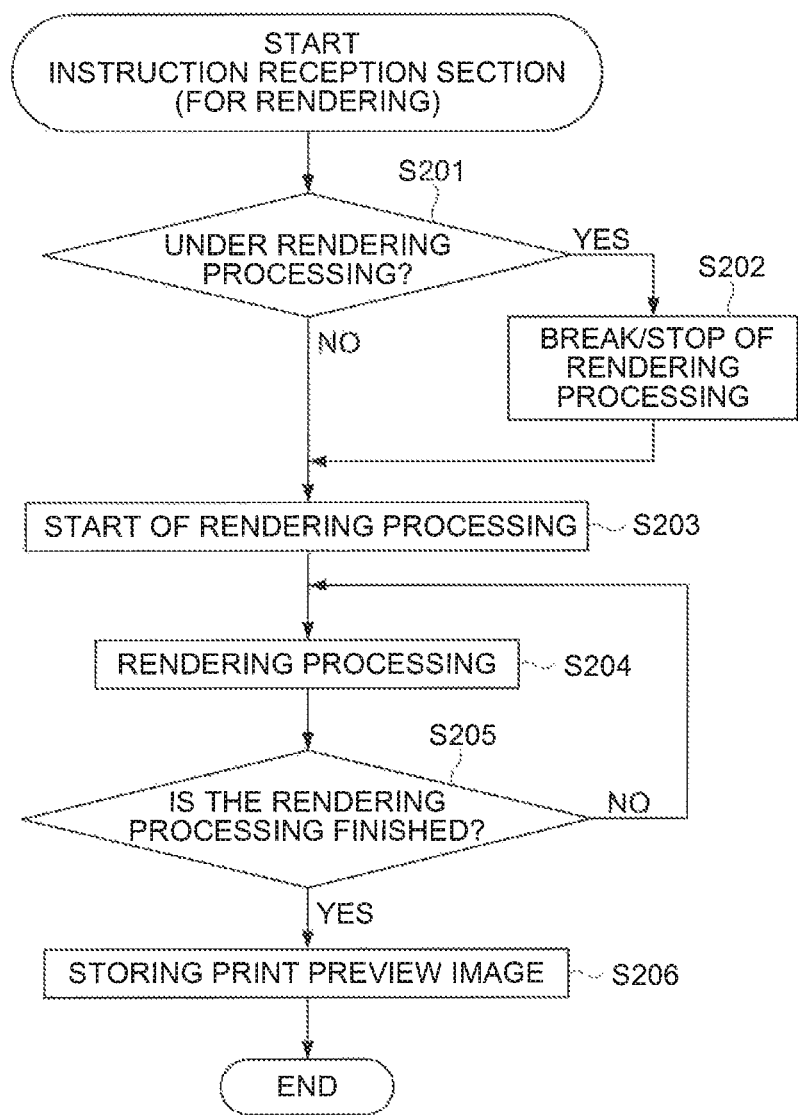
FIG. 4 is a flowchart showing processing of a Web server (preview image creating processing) relating an embodiment of the present invention.

In order to describe the above described present invention in further detail, a printing system, a preview display control program, and a preview display control method relating to an embodiment of the present invention will be described referring to FIGS. 1-5. FIG. 1 is a schematic diagram showing an overall configuration of a printing system relating to the present embodiment; FIG. 2 is a block diagram showing a software configuration of the printing system; FIG. 3 is a flowchart showing processing of a client terminal relating to the embodiment; and FIG. 4 and FIG. 5 are flowcharts showing processing of a Web server of the present embodiment.

As shown in FIG. 1, print setting system 10 of the present embodiment is configured with one or more client terminal 20 for instructing the printing, a Web server 30 for providing a Web service to the client terminal 20, and one or more printing apparatus 40 for executing the printing, which are connected with each other with network 50 such as LAN (Local Area Network) or WAN (Wide Area Network) specified by standards such as ETHERNET®, token ring, FDDI (Fiber-Distributed Data Internet. Hereinafter, each apparatus will be described in detail.

[Client Terminal]

Client terminal 20, being a computer apparatus such as a personal computer, is configured with a control section, a display section and an operation section.

The control section is provided with a CPU (Central Processing Unit), memories such as ROM (Read Only Memory) and RAM (Random Access Memory), an HDD (Hard Disc Drive), a communication I/F and the like, which are connected with each other via a bus. The CPU executes control of each section. The memories temporarily store various data read from the HDD or the communication I/F, and the stored data is processed by the CPU to be transferred to the HDD or the communication I/F as necessary. The HDD stores the programs for the CPU to control each sections (including a printer driver that enables various setting regarding the printing, a program that realizes a Web client function to enable the use of the Web service provided by Web server 30, and the like), and stores information regarding processing function of its own apparatus, which is read out by the CPU as necessary to be processed on the memory. The communication I/F, which is configured with a NIC (Network Interface Card), a modem, and the like, establishes the connection between devices via network 50 to execute transmission, and reception of the data.

The display section, which is configured with LCD (Liquid Crystal Display) and the like, displays such as a file selection screen for selecting a document file to be printed, a print setting screen for setting print conditions, or displays a print preview image on the print setting screen or on the other screen. The operation section, which is configured with a keyboard, mouse and the like, enables a print setting operation and operation with respect to the print preview image on the print setting screen.

[Web Server]

Web server 30 is a computer apparatus such as a personal computer, and is configured with a control section and the like.

The control section is provided with a CPU, memories such as ROM and RAM, an HDD, a communication I/F and the like, which are connected with each other via a bus. The CPU executes control of each section. The memories temporarily store various data read from the HDD or the communication I/F, and the stored data is processed by the CPU to be transferred to the HDD or the communication I/F as necessary. The HDD stores the programs for the CPU to control each section (including a program that realizes a Web server function to provide the Web service to client terminal 20, and the like), and stores information regarding processing function of its own apparatus, which is read out by the CPU as necessary to be processed on the memory. The communication I/F, which is configured with a NIC, a modem and the like, establishes connection between devices via network 50 to execute transmission and reception of the data.

[Printing Apparatus]

Printing apparatus 40, which is an image forming apparatus such as an MFP (Multi function Peripheral), is configured with a control section, a display section, an operation section, a drawing processing section, print section, and the like.

The control section is provided with a CPU, memories such as ROM and RAM, an HDD, a communication I/F and the like, which are connected with each other via a bus. The CPU executes control of each section. The memories temporarily store various data read from the HDD or the communication I/F, and the stored data is processed by the CPU to be transferred to the HDD or the communication I/F as necessary. The HDD stores the programs for the CPU to control each section, and stores information regarding processing function of its own apparatus, which is read out by the CPU as necessary to be processed on the memory. The communication I/F, which is configured with a NIC, a modem and the like, establishes connection between devices via network 50 to execute transmission and reception of the data.

The display section, which is configured with an LCD and the like, displays various screens regarding the printing. The operation section being configured with a touch panel enables various kinds of operation regarding the printing.

The drawing processing section analyzes the print job received from Web server 30, and forms print data by rasterizing the data of each page.

The print section is configured with necessary elements, for image formation utilizing the imaging process of electrophotographic system or electrostatic recording system, including a charging unit, a photosensitive drum, an exposure unit, a developing unit, a transfer roller, a transfer belt, a fixing unit and the like. To be more specific, the print section irradiates the light from the exposure unit according to the print data on the photosensitive drum charged by the charging unit to form an electrostatic latent image, develops the latent image by attaching charged toners with the developing unit, transfers the toner image through a primary transfer roller and a secondary transfer belt onto a paper medium, and fixes the toner image on the paper medium with the fixing unit.

In the present embodiment, printing apparatus 40 is provided with only a print function however may be provided with a scanning function, a facsimile function and the like. Although, in the above described embodiment, the rasterization is executed by the drawing processing section of printing apparatus 40, since Web server 30 executes the rasterization at the time of generating the print preview image, a configuration of transmitting the print data to printing apparatus 40 is possible for the Web server 30, which enables to omit the drawing processing section of printing apparatus 40.

Above described client terminal 20 and Web server 30 are controlled by an OA (Operating System), and a software (Web application) in charge of the print preview display control of the present embodiment is installed in the client terminal 20 and the Web server 30. FIG. 2 shows functions of the software to be executed by the printing system 10 of the present embodiment.

The control section of Web server 30 functions, with the Web application, as data control section 31, preview display image creation section 32, print job creation section 33, and the like.

Data control section 31 executes the control of a program for the Web application, screen information, a document file for the processing object, and the like. Client terminal 20 downloads the program and screen information from data control section 31, to execute, via a Web browser, the internal processing of Web application and screen display. Further, data control section 31 transmits the document file controlled in itself to the preview display image creation section 32 and print job creation section 33, and in addition, data control section 31 functions as an instruction reception section (to be described later) that receives a message from client terminal 20, and based on the received message, gives instructions to preview display image creation section 32 and print job creation section 33.

Bases on the print setting information having been set by the print setting section 25 of client terminal 20, preview display image creation section 32 executes a simulation of a print result for the document selected by the file selection section 22 of client terminal 20 to create a print preview image for previewing. Specifically, the preview display image creation section 32 executes such as processing for "N in 1" allocation, superposition processing for stapled images or punch holed images, simulation processing for folding, monochrome conversion processing, and the like.

Bases on the print setting information having been inputted by print setting section 25 of client terminal 20, print job creation section 33 creates a print job for instructing a print of the document selected by the file selection section 22 of client terminal 20. Then, data of the created print job is transmitted to printing apparatus 40, and a document is printed out by the printing apparatus 40.

Further, due to the Web application, the control section of client terminal 20 functions as image display section 21. The image display section 21 includes file selection section 22, preview operation section 23, preview display section 24, print setting section 25 and the like, and displays, on the Web browser, a print setting screen including an area for displaying a print preview image and an area for executing the print setting.

File selection section 22 executes a selection of a document file of the subject for displaying the print preview image. The selected document file is uploaded on Web server side, and is controlled by data control section 31 of Web server 30.

Preview operation section 23 executes, with respect to the preview image, a screen operation for page translation, enlargement/reduction, rotation, and the like.

Preview display section 24 displays the print preview image created by preview display image creation section 32 of Web browser 30, on a screen for print setting on the Web browser.

Based on the screen information obtained from data control section 31 of Web server 30, print setting section 25 displays a screen for print setting on the Web browser. Further, the print setting section 25 executes a control of print setting contents and a reception/control of an input from a user.

In the present embodiment, the configuration is assumed that Web server 30 creates a print preview image based on the print setting inputted at client terminal 20, and provides to the client terminal 20. However, the other configuration is possible that the client terminal 20 creates and displays in itself, the print preview image based on the inputted print setting, and even in this configuration, the deterioration of performance and operability of client terminal 20 due to the update of print preview image can be suppressed.

Hereinafter, processing of client terminal 20 and Web server 30, in a case that a user changed the print setting content on a Web browser screen of the client terminal 20, will be described referring to flow charts of FIGS. 3-5.

[Processing of Client Terminal]

First, print setting changing process to be executed on the Web browser of client terminal 20 will be described referring to a flow chart of FIG. 3. Here, a document file selected by file selection section 22 is assumed to have been sent to Web server 30 and controlled by data control section 31. Further, on the display section of client terminal 20, a print setting screen is assumed to be displayed by print setting section 25.

When a user changes a print setting content on the print setting screen of client terminal 20, print setting section 25 sends the print setting content as a message to an instruction reception section (for rendering) of Web server 30, and requests the Web server 30 for the rendering processing (print preview image creation processing) (S101).

Next, print setting section 25 starts counting of a process waiting timer for counting the timing for reflecting processing of the print preview image (S102).

Next, print setting section 25 determines if the other print setting is changed or not (S103).

In a case where the other print setting content is changed (Yes in S103), print setting section 25 sends the changed print setting content as a message to the instruction reception section of Web server 30, and newly requests the Web server 30 for the rendering processing based on said print setting content (S104). After that, print setting section 25 resets the count of the process waiting timer to be zero, to start counting (S105), and repeats the similar process after returning to S103.

Although the reason of sending the message at every time when the print setting content being changed is to enable quick acquisition of the print preview image created by Web server 30, in case of requiring lessening of the processing of Web server, or of the traffic load, the step of S104 can be omitted and the changed contents can be collectively transmitted at the time of sending the message of acquiring of the print preview image to the Web server 30 at S107 (namely, Web server 30 does not create the print preview image at every time when the print setting content is changed).

Further, the count of the process waiting timer is made reset in order to require the acquisition of print preview image based on the elapsed time from the latest print setting change, however, the configuration is possible where the acquisition of print preview image is required based on the elapsed time from the first print setting change, in which case the step of S105 can be omitted.

On the other hand, in a case where the other print setting change is not executed (No in S103), print setting section 25 determines if the process waiting timer has counted a certain predetermined time period or not (S106). If the process waiting timer has not counted the predetermined time period yet (No in S106), by returning to S103, the print setting section 25 determines again if the other print setting change is executed or not.

If the process waiting timer has counted a certain predetermined time period (Yes in S106), print setting section 25 sends a message for acquiring a print preview image reflected with the setting change content toward the instruction reception section (for image acquisition) of Web server 30, and preview display section 24 acquires the print preview image from the preview display image creation section 32 of Web server 30 (S107). After that, preview display section 24 updates the preview image on a screen with the acquired print preview image (S108), and with preview operation section 23, the user conducts screen operation with respect to the print preview image such as a page transfer, an enlargement/reduction, or a rotation, with respect to the print preview image to confirm the print preview image.

Number of seconds of the above described certain time period can be properly established by an administrator or a user, according to the circumstances of operation. For example, in a case of the client terminal 20 with low performance specification (low processing capability), since frequent updates of the print preview image may cause deterioration of the performance, the certain time period is set to be about 5 seconds. While, in a case of the client terminal 20 with high performance specification (high processing capability), since deterioration of the performance due to the frequent updates of the print preview image needs not be considered, the certain time period may be set to zero second (real time update).

Further, in a case of low communication rate between client terminal 20 and Web server 30, since frequent updates of the print preview image may cause deterioration of the performance and increase of traffic load, the certain time period is set to be about 3 seconds. While, in a case of high communication rate between client terminal 20 and Web server 30, since deterioration of the performance or the increase of traffic load due to the frequent updates of the print preview image needs not be considered, the certain time period may be set to about two seconds.

Further, the above certain time period can be set to be changed in stepwise according to the number of changed times of the print setting, such as 3 seconds in first time, and 2 seconds in second time.

[Processing of Web Server]

Next, the processing to be executed by Web server 30 as a Web service (preview image creation processing) will be described referring to the flowchart of FIG. 4. In this processing, creation of print preview image (rasterization), capable for preview display, is executed based on a print setting content sent from client terminal 20. This processing is executed with background processing.

Firstly in S101 (or S104) of FIG. 3, when the message requesting the creation of print preview image is sent from client terminal 20, data control section 31 determines if the rendering processing is presently executed or not in the preview display image creation section 32 (S201). In a case where the rendering processing is presently executed (Yes in S201), the preview display image creation section 32 breaks of or doses the rendering processing under execution (S202).

After breaking off or closing the rendering processing under execution, or in the case where the rendering processing is not presently executed (No in S201), data control section 31 notifies the preview display image creation section 32 of the print setting content, and the preview display image creation section 32 starts the rendering processing based on the print setting content (S203). The rendering processing is executed until finishing (S204), and when the rendering promising is finished (Yes in S205), the created print preview image is stored (S206) and a series of the processing is completed.

Next, the processing to be executed by Web server 30 as a Web service (print preview image acquisition processing) will be described referring to the flowchart of FIG. 5. In this processing, the print preview image, created by preview image creation section 32 based on the request for print preview image acquisition sent from client terminal 20, is sent to the client terminal 20. This processing is also executed with the background processing.

In S107 of FIG. 3, when the message for acquisition of the print preview image is sent from client terminal 20, data control section 31 confirms the status of executing the rendering processing of the print preview image in the preview display image creation section 32 (S301), and determines if the rendering processing is finished or not (S302). In the case where the rendering processing is not finished (No in S302), the data control section waits the completion of the rendering processing by returning to S301.

In the case where the rendering processing has been finished (Yes in S302), data control section 31 acquires the print preview image, created and stored by the preview image creation section 32 (S303), and sends the acquired print preview image to client terminal 20 (S304) to complete the series of promising.

According to the control based on FIGS. 3-5, in the case where the predetermined time period has elapsed after the print setting was changed one time, the print preview image to be sent to client terminal 20 becomes an image reflected with the one time change, and in the case where the predetermined time period has elapsed after the print setting was changed in plural times, the print preview image to be sent to client terminal 20 becomes an image reflected with the changes of plural times. Further hr cases where the determination is based on the elapsed time from the first change of the setting content, in case that the other change is not executed within the predetermined period, the print preview image to be sent becomes an image reflected with the first change, and in case that the other change is executed within the predetermined period, the print preview image to be sent becomes an image reflected with the changes of plural times.

As described above, according to the present embodiment, since client terminal 20 acquires the print preview image from Web server 30 and updates the print preview image in case that the predetermined time period has elapsed after changing the print setting, deterioration of the performance and operability, and increase of traffic load can be suppressed and the print setting can be properly confirmed.

The present invention should not be restricted by the above-described embodiment, and the configuration and the control are changeable without departing from the scope of the present invention.

For example, the above described embodiment is configured such that Web server 30 acquires the print setting information inputted at client terminal 20, creates the print preview image, and sends to the client terminal, however, the present invention can be applied in the case where client terminal 20 creates and displays the print preview image by itself.

The present invention is applicable to a preview display control method for displaying the preview image at the time of print setting, and a printing system including an apparatus for displaying the preview image.

DESCRIPTION OF REFERENCE NUMERALS

10: printing system
20: client terminal
21: image display section
22: file selection section
23: preview operation section
24: preview display section
25: print setting section
30: Web server
31: data control section
32: preview display image creation section
33: print job creation section
40: printing apparatus
50: network

What is claimed is:

1. A printing system including a client terminal to accept a change of print setting, a printing apparatus to execute printing, and a Web server for allowing a Web browser of the client terminal to display a print preview image created by reflecting a changed print setting, wherein the client terminal, the printing apparatus and the Web server are connected by a network, and wherein:
(i) the client terminal comprises:
a print setting section which, in cases where a print setting is changed on a screen, notifies the Web server of the changed print setting and requires creation of a print preview image, and when a predetermined time period has elapsed after the print setting was changed, notifies the Web server of a request of acquiring the print preview image created by reflecting the changed print setting; and
a preview display section which displays, on the screen, the print preview image acquired from the Web server, and
(ii) the Web server comprises:
a control section which, in cases where the changed print setting is notified from the client terminal, creates the print preview image by reflecting the changed print setting, and when the request of acquiring the print preview image is notified from the client terminal, sends the print preview image created by reflecting the changed print setting to the client terminal;
wherein the predetermined time period is established to be changed stepwise according to a number of times of the print setting change.

2. The printing system of claim 1, wherein the print setting section, in cases where another print setting change is not executed during the predetermined time period after a last print setting change was executed, acquires the print preview image created by reflecting up to the last print setting change, from the Web server.

3. The printing system of claim 1, wherein the predetermined time period is established based on at least one of processing capability of the client terminal and communication circumstances between the Web server and the client terminal.

4. A printing system including a client terminal to accept a change of print setting, a printing apparatus to execute printing, and a Web server for allowing a Web browser of the client terminal to display a print preview image created by reflecting a changed print setting, wherein the client terminal, the printing apparatus and the Web server are connected by a network, and wherein:
(i) the client terminal comprises:
a print setting section which, in cases where a print setting is changed on a screen, notifies the Web server of the changed print setting and requires creation of a print preview image, and when a predetermined time period has elapsed after the print setting was changed, notifies the Web server of a request of acquiring the print preview image created by reflecting the changed print setting; and
a preview display section which displays, on the screen, the print preview image acquired from the Web server, and
(ii) the Web server comprises:
a control section which, in cases where the changed print setting is notified from the client terminal, creates the print preview image by reflecting the changed print setting, and when the request of acquiring the print preview image is notified from the client terminal, sends the print preview image created by reflecting the changed print setting to the client terminal;
wherein the print setting section, in cases where plural print setting changes are executed during the predetermined time period, acquires the print preview image created by reflecting the plural print setting changes, from the Web server; and
wherein the predetermined time period is established to be changed stepwise according to a number of times of the print setting change.

5. A non-transitory computer readable storage medium having a program stored thereon that is executable by a computer to perform a preview display method for controlling a client terminal which, being connectable to a Web server, accepts a change of print setting and allows a Web browser of the client terminal to display a print preview image created by reflecting a changed print setting, said method comprising operations of:
notifying, in cases where the print setting is changed on a screen, the Web server of the changed print setting and requiring creation of a print preview image, and when a predetermined time period has elapsed after the print setting was changed, notifying the Web server of a request of acquiring the print preview image created by reflecting the changed print setting; and displaying, on the screen, the print preview image acquired from the Web server;

wherein the predetermined time period is established to be changed stepwise according to a number of times of the print setting change.

6. The non-transitory computer readable storage medium of claim 5, wherein in cases where another print setting change is not executed during the predetermined time period after a last print setting change was executed, the print preview image is created by reflecting up to the last print setting change notified from the Web server.

7. A non-transitory computer readable storage medium having a program stored thereon that is executable by a computer to perform a preview display method for controlling a client terminal which, being connectable to a Web server, accepts a change of print setting and allows a Web browser of the client terminal to display a print preview image created by reflecting a changed print setting, said method comprising operations of:

notifying, in cases where the print setting is changed on a screen, the Web server of the changed print setting and requiring creation of a print preview image, and when a predetermined time period has elapsed after the print setting was changed, notifying the Web server of a request of acquiring the print preview image created by reflecting the changed print setting; and displaying, on the screen, the print preview image acquired from the Web server;

wherein in cases where plural print setting changes are executed during the predetermined time period, the print preview image is created by reflecting the plural print setting changes notified from the Web server; and wherein the predetermined time period is established to be changed stepwise according to a number of times of the print setting change.

8. The non-transitory computer readable storage medium of claim 5, wherein the predetermined time period is established based on at least one of processing capability of the client terminal and communication circumstances between the Web server and the client terminal.

9. A client terminal being connectable to a Web server which accepts a change of print setting and allows a Web browser of the client terminal to display a print preview image created by reflecting the changed print setting, the client terminal comprising:

a print setting section which, in cases where the print setting is changed on a screen, notifies the Web server of the changed print setting and requires creation of the print preview image, and when a predetermined time period has elapsed after the print setting was changed, notifies the Web server of a request of acquiring the print preview image created by reflecting the changed print setting; and a preview display section which displays, on the screen, the print preview image acquired from the Web server;

wherein the predetermined time period is established to be changed stepwise according to a number of times of the print setting change.

10. The client terminal of claim 9, wherein the print setting section, in cases where plural print setting changes are executed during the predetermined time period, acquires the print preview image created by reflecting the plural print setting changes, from the Web server.

11. The client terminal of claim 9, wherein the predetermined time period is established based on at least one of processing capability of the client terminal and communication circumstances between the Web server and the client terminal.

12. The client terminal of claim 9, wherein the print setting section, in cases where another print setting change is not executed during the predetermined time period after a last print setting change was executed, acquires the print preview image created by reflecting up to the last print setting change, from the Web server.

13. A preview display method for controlling a client terminal which, being connectable to a Web server, accepts a change of print setting and allows a Web browser of the client terminal to display a print preview image created by reflecting a changed print setting, the method comprising:

notifying, in cases where the print setting is changed on a screen, the Web server of the changed print setting and requiring creation of a print preview image, and when a predetermined time period has elapsed after the print setting was changed, notifying the Web server of a request of acquiring the print preview image created by reflecting the changed print setting; and displaying, on the screen, the print preview image acquired from the Web server;

wherein the predetermined time period is established to be changed stepwise according to a number of times of the print setting change.

14. The preview display method of claim 13, wherein in cases where plural print setting changes are executed during the predetermined time period, the print preview image is created by reflecting the plural print setting changes notified from the Web server.

15. The preview display method of claim 13, wherein the predetermined time period is established based on at least one of processing capability of the client terminal and communication circumstances between the Web server and the client terminal.

16. The preview display method of claim 13, wherein in cases where another print setting change is not executed during the predetermined time period after a last print setting change was executed, the print preview image is created by reflecting up to the last print setting change notified from the Web server.

* * * * *